United States Patent
Lewis et al.

(10) Patent No.: US 10,417,349 B2
(45) Date of Patent: Sep. 17, 2019

(54) CUSTOMIZED MULTI-DEVICE TRANSLATED AND TRANSCRIBED CONVERSATIONS

(71) Applicant: Microsoft Technology Licensing, LLC, Redmond, WA (US)

(72) Inventors: William D Lewis, Seattle, WA (US); Ivo José Garcia dos Santos, München (DE); Tanvi Surti, Mumbai (IN); Arul A Menezes, Sammamish, WA (US); Olivier Nano, Munich (DE); Christian Wendt, Woodinville, WA (US); Xuedong Huang, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 177 days.

(21) Appl. No.: 15/623,111

(22) Filed: Jun. 14, 2017

(65) Prior Publication Data

US 2018/0365232 A1 Dec. 20, 2018

(51) Int. Cl.
*G06F 17/28* (2006.01)
*G10L 15/26* (2006.01)

(52) U.S. Cl.
CPC .......... *G06F 17/289* (2013.01); *G10L 15/265* (2013.01)

(58) Field of Classification Search
None
See application file for complete search history.

(56) References Cited

U.S. PATENT DOCUMENTS 4,882,681 A  11/1989  Brotz
7,953,590 B2  5/2011  Gao et al.
(Continued)

FOREIGN PATENT DOCUMENTS

WO  2017034736 A2  3/2017

OTHER PUBLICATIONS

Ochoa, Andrew, "Meet the Pilot: Smart Earpiece Language Translator", https://www.indiegogo.com/projects/meet-the-pilot-smart-earpiece-language-translator-headphones-travel, Retrieved on: Apr. 27, 2017, 3 pages.
(Continued)

*Primary Examiner* — Satwant K Singh
(74) *Attorney, Agent, or Firm* — Shook, Hardy & Bacon L.L.P.

(57) ABSTRACT

Systems and methods may be used to provide transcription and translation services. A method may include initializing a plurality of user devices with respective language output selections in a translation group by receiving a shared identifier from the plurality of user devices and transcribing the audio stream to transcribed text. The method may include translating the transcribed text to one or more of the respective language output selections when an original language of the transcribed text differs from the one or more of the respective language output selections. The method may include sending, a user device in the translation group, the transcribed text including translated text in a language corresponding to the respective language output selection for the user device. In an example, the method may include customizing the transcription or the translation, such as to a particular topic, location, user, or the like.

20 Claims, 5 Drawing Sheets

(56) References Cited

U.S. PATENT DOCUMENTS

| | | |
|---|---|---|
| 8,515,728 B2 * | 8/2013 | Boyd .................... G06F 17/28 |
| | | 704/2 |
| 9,438,294 B2 | 9/2016 | Boesen |
| 9,443,518 B1 * | 9/2016 | Gauci .................... G06F 17/28 |
| 9,542,486 B2 * | 1/2017 | Cuthbert ............... G06F 16/683 |
| 9,928,237 B2 * | 3/2018 | Levi ...................... G06F 9/454 |
| 10,013,418 B2 * | 7/2018 | Usami ................... G06F 17/289 |
| 2006/0271370 A1 | 11/2006 | Li |
| 2009/0125295 A1 | 5/2009 | Drewes |
| 2012/0284014 A1 | 11/2012 | Zivkovic |
| 2013/0166275 A1 | 6/2013 | Yang et al. |
| 2014/0358516 A1 | 12/2014 | Lin et al. |
| 2018/0329898 A1 * | 11/2018 | Fujiwara ............. G06F 17/2854 |
| 2019/0012314 A1 * | 1/2019 | Kim ...................... G06Q 50/10 |

OTHER PUBLICATIONS

"SIGMO talk & understand in more than 25 languages", https://www.indiegogo.com/projects/sigmo-talk-understand-in-more-than-25-languages, Retrieved on: Apr. 27, 2017, 7 pages.

Kroulek, Alison, "7 Powerful Translation Apps and Devices for Travellers in 2016", http://www.k-international.com/blog/translation-apps-2016/, Published on: May 25, 2016, 8 pages.

Anthony, Sebastian, "Microsoft unveils universal translator that converts your voice into another language", https://www.extremetech.com/extreme/122083-microsoft-unveils-universal-translator-that-converts-your-voice-into-another-language, Published on: Mar. 12, 2012, 4 pages.

""ChaTra" the speech translation application in smartphone: real-time multilingual communication by multiple people", https://www.nict.go.jp/en/press/2011/10/1013-1.html, Published on: Oct. 13, 2011, 3 pages.

* cited by examiner

US 10,417,349 B2

CUSTOMIZED MULTI-DEVICE TRANSLATED AND TRANSCRIBED CONVERSATIONS

BACKGROUND

According to some sources, there are approximately 7,000 living languages in the world, and about 400 have over one million speakers. Communication among people with different native or spoken languages may be challenging without translation services. Traditionally, translations relied on people who were bilingual to translate between languages. Relying on humans is time consuming, costly, and generally unavailable, especially for common or everyday interactions.

Translation services have been introduced that make use of machine learning and other artificial intelligence to perform machine translations. However, up to now, these translation services have suffered from drawbacks that make widespread use limited. For example, some translation services require the use of a single device to conduct a turn-taking translated conversation between two participants. These translation services are limited because they do not allow more than two participants, they require both participants to be located very close to the single device, and they force turn-taking. Some other translation services allow for remote two-person translated conversations. However, these translation services are also limited because they do not allow more than two participants, they require both participants to be on the same platform, and they require the participants to be situated remotely.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
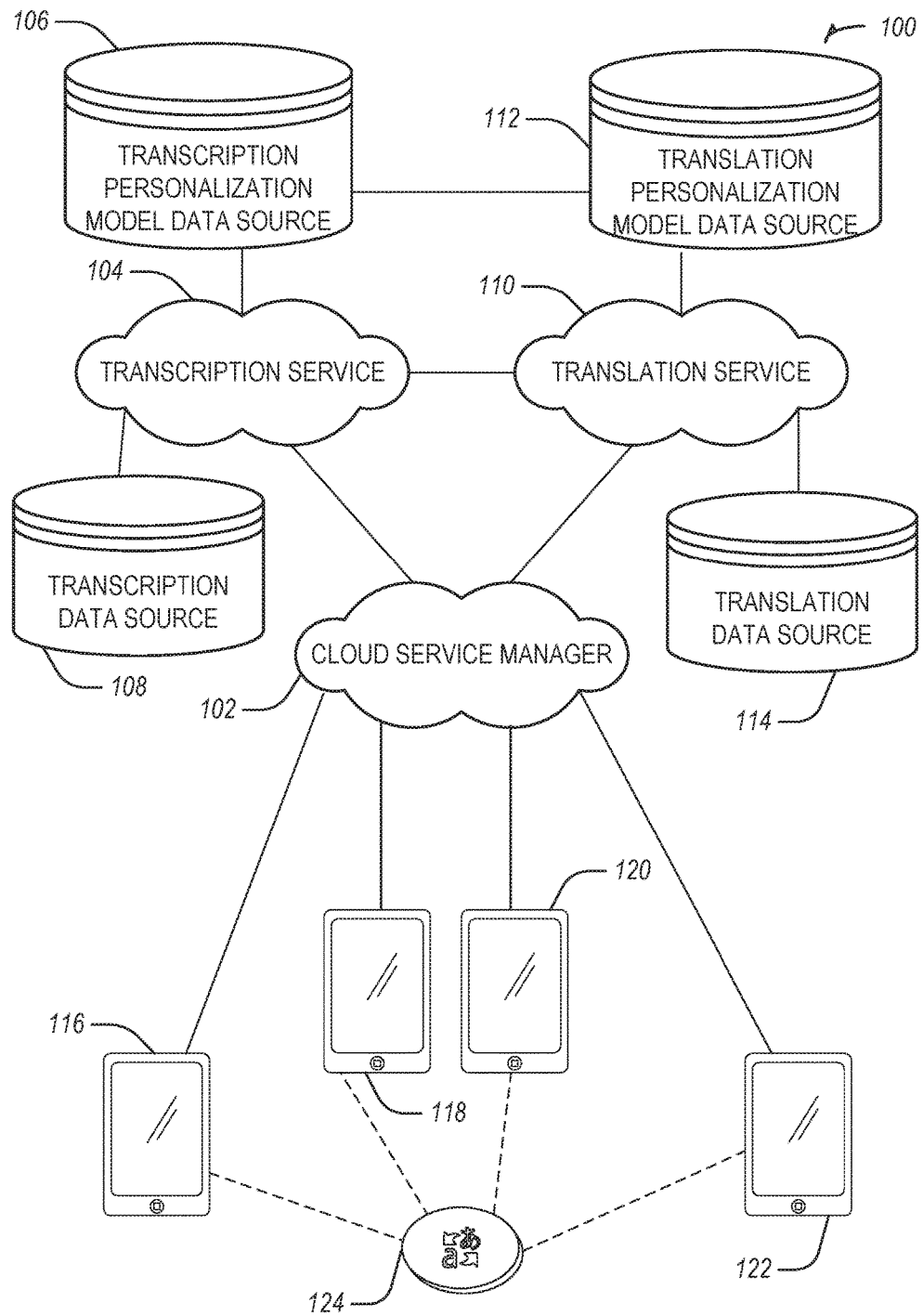
FIG. 1 illustrates a transcription and translation system in accordance with some embodiments.

Systems and methods for providing translation services are described herein. The systems and methods described herein use techniques to allow two or more people to speak in different (or the same) languages and receive transcribed, translated text (or audio) in a user-selected language. The techniques described herein may provide a text stream in a selected language that includes words spoken by all participants, regardless of the spoken language. In an example, these techniques allow for a natural language flow, without requiring turn-taking by the participants. For example, three or more users may speak into respective devices and each device may display the spoken words or playback audio in substantially or near real-time. In an example, a user may speak without needing to indicate that the user intends to speak. In another example, the user may indicate an intent to speak (e.g., by pressing a button on a user interface), and while speaking, another user may also indicate an intent to speak. In this way, the two users may be sending audio information to a cloud service during overlapping time periods.

The techniques described herein include an in-person or remote translation service that enables two or more users speaking different languages to connect or initiate their personal devices to a transcription and translation group. For example, the personal devices may be initiated using a proximity device or service, such as a Bluetooth low energy device (e.g., an iBeacon), RFID, NFC, Wi-Fi direct, a barcode, a QR code, other proximity services, or a code (e.g., an alphanumeric code or like identifier). The proximity device or service may be separate from the personal devices. The group allows the two or more users to have a translated or transcribed conversation. For example, each user speaks into a personal device and other participants may follow along in the language of their choice on their own personal devices.

In an example, three users have three respective devices. A first user speaks Italian, a second user speaks English. and a third user speaks French. The first user selects Italian as the language to receive text of the conversation on a first device corresponding to the first user. The second user selects English on a second device, and the third user selects French on a third device. In an example, the selected language may be used for transcription purposes in addition to identifying what language to display (e.g., audio from the first user may be sent to an Italian transcription engine). The three users may have a conversation, remotely or in person, speaking naturally while reading responses from the other users on the respective personal devices. For example, the first user may say "Ciao, come stai?" which may be transcribed at a cloud service. The transcription may be sent back to the first device, displaying text of what the first user spoke. The second user may see a translation displayed on the second device in English of "Hello, how are you?" and the third user may see a translation displayed on the third device in French of "Bonjour, ca va?" or the like.

In an example, colloquialisms or user-specified preferences may be used instead of, or in addition to, direct or best fit translations. The second and third users may both respond simultaneously or during overlapping time periods or in turn. For example, the second user may say "good" which may be transcribed and translated to the first and third users as "buono" and "bon" respectively. In an example, a fourth user may join the conversation with a fourth device, for example set to English. The fourth user would see the transcription of "good" sent by the second user without needing to use a translation service, since the fourth user and the second user set the same language. The second user and the fourth user may receive different transcriptions if their personalized or customized transcription or translation models include different outputs. For example, the second user may have a smaller vocabulary, and request translations not include overly difficult words. The fourth user may be trying to expand his or her vocabulary, and may request more difficult words.

The transcription or translation services described herein may include automatically adapting the transcription or translation to the individuals who are participating or to a domain of the conversation. For example, a user may have a customized model for transcription or a customized model for translation. In an example, the transcription or translation service may include a domain-specific model. For example, a model may be selected based on a profession, a topic, a location (e.g., using regional dialects), or from a user-selected pre-defined model (e.g., including industry-specific language or in-jokes for a group). In an example, the transcription service may be used by an individual with hearing loss or difficulty, to receive a transcript of a conversation, even if the conversation is conducted in a language that the individual understands. The transcription service may be used independently of the translation service.

In an example, the translation service may utilize the Microsoft Translator app by Microsoft Corporation of Redmond, Wash. The translation service may use a speech-to-speech application programming interface (API) or speech recognition customization technology, such as a custom speech service, for example to enable two or more users to enter customized translated conversations via an app or browser client. A group may be established for two or more users based on a custom proximity detection device or service, for example a device that may be placed on store countertops or installed in conference rooms that embeds custom conversation information to direct devices to seamlessly connect.

FIG. 1 illustrates a transcription and translation system 100 in accordance with some embodiments. The transcription and translation system 100 includes a cloud service manager 102, a transcription service 104, and a translation service 110. In an example, the transcription service 104 and the translation service 110 may be used independently or in conjunction with each other. A transcription or translation service may be initiated by a user device (e.g., 116, 118, 120, 122).

In an example, a user of the user device 116 may initiate a group transcription or translation session by activating the group on the user device 116. Activating the group may include using an app to start a group, entering an alphanumeric code, scanning a Bluetooth low energy device (e.g., an iBeacon), RFID, NFC, or other proximity service or device (e.g., device 124, which may include a conference call phone device, a sticker, a hub, or the like), scanning a barcode or a QR code, or the like. Other devices, such as the user device 118 may join the group based on the selected method of the user of the user device 116. For example, the user device 116 may display an alphanumeric code that the user of the user device 118 may enter on the user device 118 to join the group. When the group is initiated by a proximity service or device, the user device 118 may be placed in proximity to the service or device to activate the group. When the group is initiated by scanning a machine readable code (e.g., barcode or QR code), the user device 118 may scan the code to join the group. After the group is created and one or more user devices are added to the group, transcription or translation services may be provided to the one or more user devices.

Each of the user devices (e.g., 116, 118, 120, 122) that have joined a group transcription or translation session may communicate with the cloud service manager 102 directly. In an example, the user devices (e.g., 116, 118, 120, 122) do not need to communicate directly with each other. For example, the user device 116 may receive audio spoken by a first user, and the audio may be sent to the cloud service manager 102. Depending on language selections for the user device 116 or other user devices in the group session, the cloud service manager 102 may send the audio to the transcription service 104 or the translation service 110. In another example, text may be entered at one of the user devices (e.g., 116, 118, 120, 122), which may be sent to the cloud service manager 102.

When audio is sent by a user device, the cloud service manager 102, sends the audio to the transcription service 104 to extract text from the audio. The transcription service 104 may transcribe the text from the audio using a transcription data source 108 (e.g., a database, a repository, a model, such as a machine learning model, etc.). In an example, the transcription service 104 may use a transcription personalization model data source 106 (e.g., a database, a repository, a model, such as a machine learning model, etc.) to further interpret the audio, determine text from the audio, or customize the output to a model. The transcription personalization model data source 106 may include user personalized models (e.g., as selected using an opt-in feature by the user device 116), language-specific models (e.g., based on a technical subject, a regional dialect, an accent, foreign-language words, technical jargon specific to a particular domain, people's names, product or brand names, technical jargon used within an institution, or the like).

The transcription service 104 may output transcribed text to the cloud service manager 102 or to the translation service 110. For example, when the user devices in a group all select the same language as the transcribed text, the transcribed text from the transcription service 104 may go directly to the cloud service manager 102 to distribute to the user devices (e.g., 116, 118, 120, 122) without sending to the translation service 110. In another example, the cloud service manager 102 may receive the transcribed text and send it to the translation service 110 or the transcription service 104 may send the transcribed text to the translation service directly. This example flow may be used if one of the user devices has a different language selected than that of the transcribed text. In an example, a user may practice a first language by speaking in the first language and requesting output text in a second (e.g., native) language to see how the user did speaking the first language.

Text may be received by the translation service 110 via cloud service manager 102 (e.g., from the transcription service 104 or from text entered at one or more of the user devices within a group) or directly from the transcription service 104. The translation service 110 may use a translation data source 114 (e.g., a database, a repository, a model, such as a machine learning model, etc.) to translate the text to translated text. The translated text may be modified or created using information in a translation personalization model data source 112 (e.g., a database, a repository, a model, such as a machine learning model, etc.). The translation personalization model data source 112 may include user personalized models (e.g., as selected using an opt-in feature by the user device 116) or language-specific models (e.g., based on a technical subject, a regional dialect, an accent, foreign-language words, technical jargon specific to a particular domain, people's names, product or brand names, technical jargon used within an institution, or the like). In an example, the transcription personalization model data source 106 and the translation personalization model data source 112 may be combined to use a single model or may use a service to communicate and update models based on information received at one of the data sources. In another example, the data sources may be maintained separately, such that a model for transcription may differ from a model for translation. In yet another example, some information may cross between the data sources while keeping other information separate. For example, user selected model attributes may be kept only for the customizations requested by the user, while language-specific models may be updated when improved (e.g., using machine learning). The user customizations or models may be deleted from any of the data sources 106 or 112 when requested by the user. The translation personalization model data source 112 or the transcription personalization model data source 106 may receive a user instruction to store history (e.g., previous conversations from the same user) to customize the speech recognition (e.g. through personalized models) to the individual user.

When the translation service 110 completes translating the transcribed or entered text for one of the languages selected by one of the user devices in a group, the translation service 110 may send the translated text to the cloud service manager 102 for distribution to the specific user device (e.g., 116, 118, 120, or 122) that has identified the respective language of the translated text. The cloud service manager 102 may use a service to create audio from the text, or the user's device may turn the text into audio, which may be played at the user's device in the received language.

The transcription and translation system 100 may be scaled to large groups (e.g., dozens or hundreds of user devices) with multiple languages. The proximity detection service or device 124 may be used to present a seamless setup with a low barrier of entering a group conversation and translated conversations may be conducted with strangers (e.g., at hotels, conference rooms, during travel, in retail environments, or in a taxi). In an example, a user does not need to add another user as a contact or accept a friend request from the other user to enter a group. Instead, the proximity detection service or device 124 may connect two or more users in a conversation without direct communication between devices of the two or more users.

In an example, the transcription and translation system 100 may support users who have hearing loss or difficulty or who are deaf by allowing in-person encounters with a text-based display for the user with hearing challenges while permitting another user to speak normally. In an example, the user with hearing challenges may write text to reply, which may be sent via the cloud service manager 102 to the other user's device. The cloud service manager 102 may use a service to create audio from the text, or the other user's device may turn the text into audio, which may be played at the other user's device. A customized transcription (e.g., using the transcription personalization model data source 106 as selected by the user) may allow the user with hearing challenges to accurately see text of what is spoken, and also allow the user to speak and be understood by the speech recognition.

By allowing each user to speak into the user's own device, a higher quality of speech recognition will naturally occur, since the user's own device's microphone will be better able to capture the audio, and the user may have a customized speech recognition model assigned to the user's own device. In an example, the transcription and translation system 100 may be used for a one-directional conversation such as a lecture or guided tour.

In an example, the transcription personalization model data source 106 or the translation personalization model data source 112 may retrieve or store information regarding local context, such as from contact lists, search history, geolocation, use case data, or the like, to customize the transcription or translation to a relevant scenario. In an example, a user device does not need a graphical display. The user device may be a wearable or stationary device of any form-factor.

The transcription and translation system 100 does not force turn-taking among participants. Instead, participants may have natural conversations that include interruptions and multiple people speaking at same time or during overlapping time periods.

In an example, the cloud service manager 102 may communicate with a group device, such as hardware present in conference rooms such as a hub, which may project a transcript or translation of the conversation on a display screen. In this example, a group of people that share a common language may use the group device instead of individual devices. Other users that do not share the common language may use their own devices to communicate and receive transcriptions or translations.

Personalization models may be created by a user or by an artificial intelligence system (e.g., using machine learning). In an example, a user may upload data to be used in automatically generating a personalization model (e.g., a slideshow deck may be uploaded as an input for a presentation model other documents containing technical language, address books containing personal or place names, or the like). A model generation system may extrapolate from user uploaded data. After a personalization model is created for a user, the user may use the model to modify or accentuate transcription or translation services. The user may delete the personalization model at any time. The personalization model may not be reverse engineered to generate the uploaded data, so privacy of the user's data is secured.

The personalization models may be presented as an opt-in service, to allow users to retain privacy and control of the users' data. In an example, historical conversations, text, or audio from a user may be used when the user selects this enhancement to improve the transcription or translation services 104 or 110. For example, the transcription or translation services 104 or 110 may store information in respective data sources 106 or 112 to create a model that tracks a user's particular usage to improve understanding and output. In an example, personalization models may be created based on one or more sets of topics received from a user by clustering customization to the topic. For example, a topic may be created for conversations on software development, a topic for a wine club, content from a technical college course, an address book containing person or place names, including optionally unusual or unique person or place names, etc. These topics may be generalized or may be customized to the user. The topics may be specific to a single conversation (e.g., a speech) or may be more general. In an example, personalization models may have a public model mode, such as where public lecturers or university employees, for example, may supply models to share and allow other users to base their lectures on the topic models. For example, a university lecturer may create a model based on typical words used in lectures. The model may be given to students who wish to have a transcription or translation of a lecture to improve the output text. In an example, the model may be refined by the university lecturer over the years. The personalization models may have organization-level boundaries (e.g., within a university, within a corporation, etc.) or may be shared (or sold).

Figure 2:
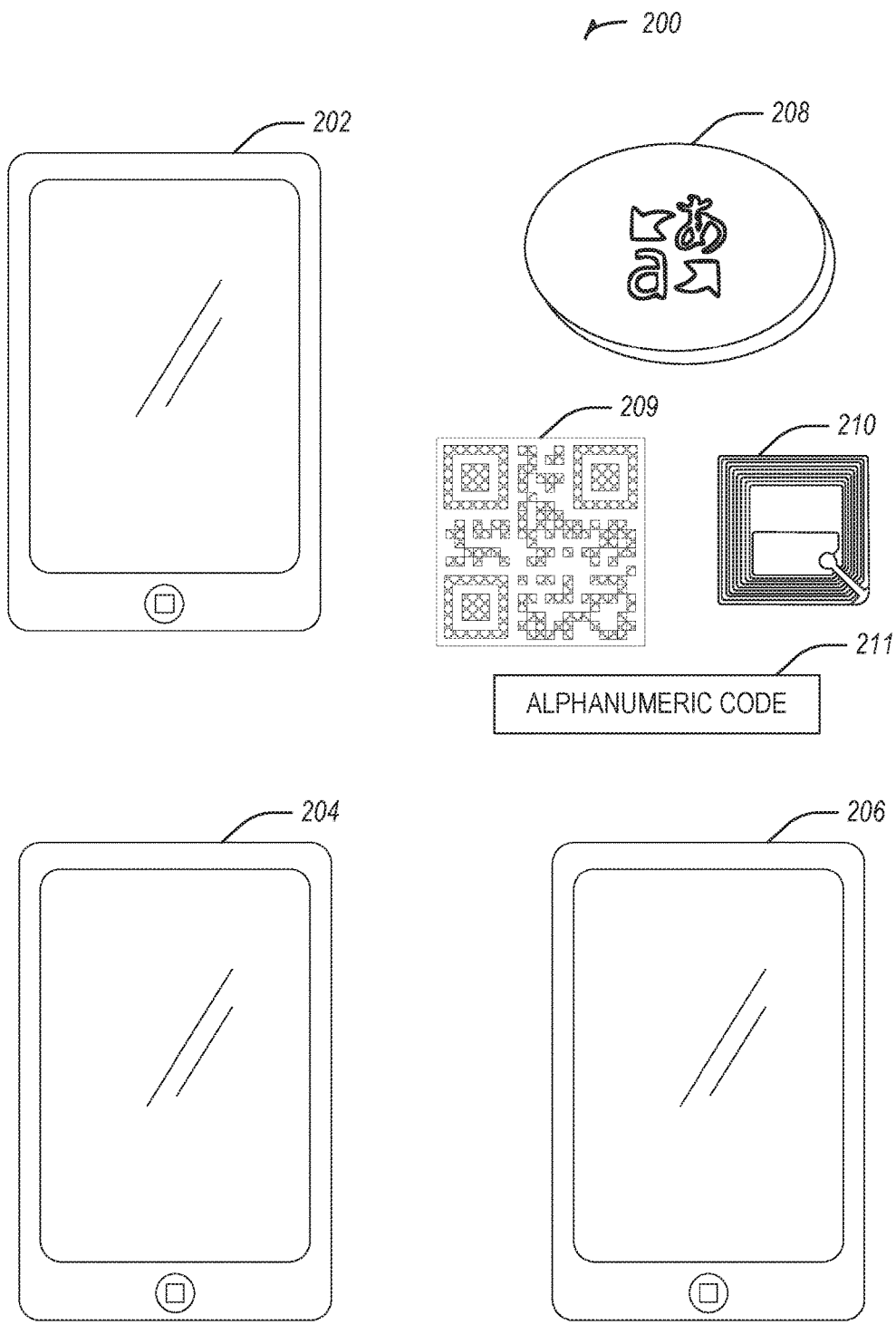
FIG. 2 illustrates a diagram showing user devices and initiation objects in accordance with some embodiments.

FIG. 2 illustrates a diagram 200 showing user devices (e.g., 202, 204, and 206) and initiation objects (e.g., 208, 209, 210, and 211) in accordance with some embodiments. The initiation objects may include a hub or device 208, a QR code 209 (or other machine readable code), a proximity device 210 (e.g., an RFID chip, NFC chip, a Bluetooth low energy device (e.g., an iBeacon), etc.), or a printed object, such as an alphanumeric code 211 (which may be "printed" in the sense of being displayed on a user interface, such as on one or more of the user devices 202, 204, or 206, or on the device 208). In an example, the device 208 may include the proximity device 210, the QR code 209, or may broadcast or send the alphanumeric code 211 or other access information to a group or a device.

In an example the user device 202 may initiate a group conversation by selecting an option to create a group using an app or a website interface. Once created, other user devices, such as 204 or 206 may join the group. The group may be joined by using one or more of the initiation objects. In an example, a single initiation object may be used for the group. In another example, more than one initiation object may be available to a user to join the group. The user devices joining the group may be proximate to the user device 202 or may be remote from the user device 202. Here, proximate may mean within range of proximity services of one of the initiation objects. Remote may be anywhere. In an example, the user devices do not need to remain within range of the proximity services of one of the initiation objects after initiation into the group is complete. In another example, the group may be maintained only for devices within range of a proximity service (e.g., of an initiation device, such as for a secure lecture or of a user device that initiated the group, such as for a guided tour).

Figure 3:
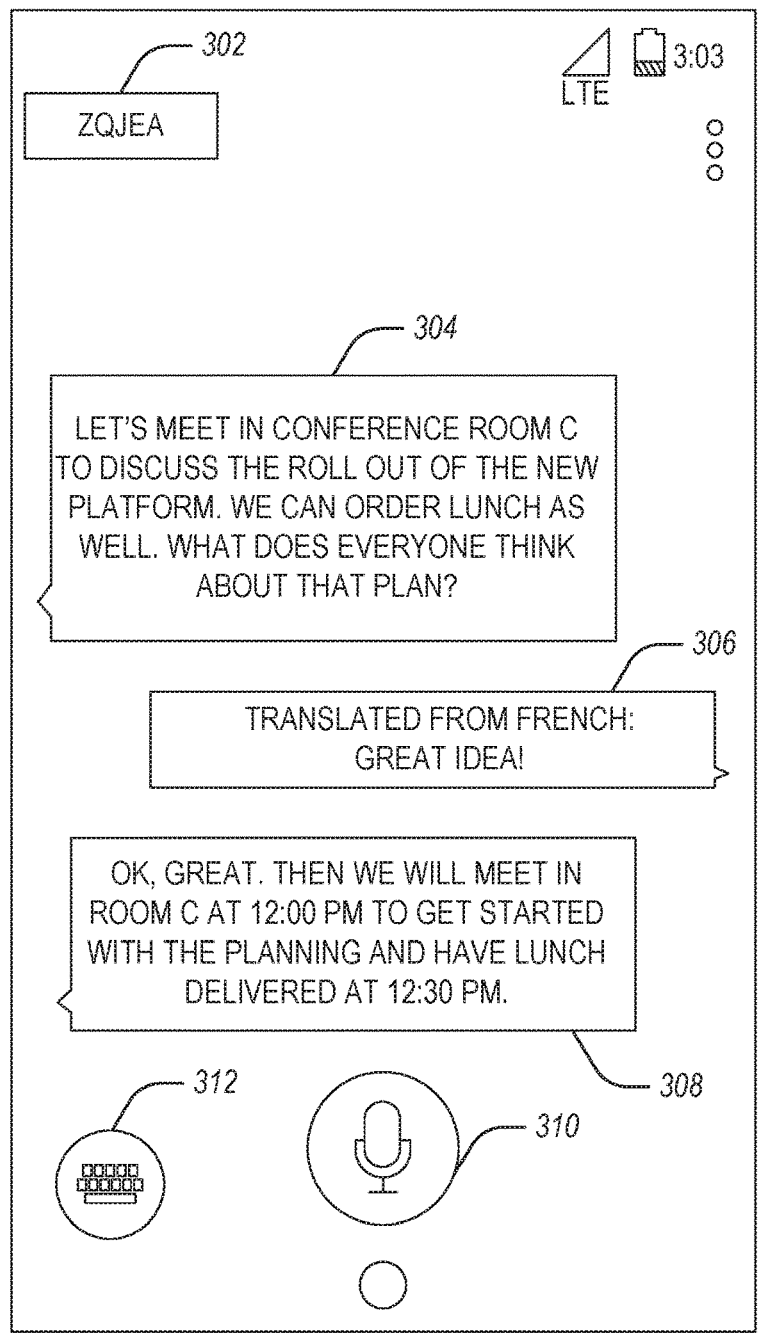
FIG. 3 illustrates an example user interface for use in a transcription and translation system in accordance with some embodiments.

FIG. 3 illustrates an example user interface 300 for use in a transcription and translation system in accordance with some embodiments. The user interface 300 includes an example alphanumeric code 302 for joining a group. The user interface 300 illustrates a group conversation after initiation and after a few text transcriptions or translations have occurred. The alphanumeric code 302 is optional, and may be replaced with an indication of an initiation object to be used to join a group (e.g., an icon of a QR code, RFID chip, etc.).

The user interface 300 includes a sample conversation with text from a user of the user interface 300 (e.g., text 304 and 308), as well as a response from another device (text 306). Text 306 includes an optional indication that the text has been translated from another language. The text 304 from the user may be entered text or spoken and transcribed text. In an example, text 308 may include text not yet sent. The icon 312 may represent a keyboard that, when selected by a user, opens a keyboard for the user to type text into the user interface 300. The icon 310 may represent a microphone. When icon 310 is selected, audio may be recorded by a device displaying the user interface 300. The recorded audio may be sent to a cloud service for transcription or translation services, and text may be returned to be displayed on the user interface 300. The icon 310 may be activated by pressing or by holding the icon 310 to record audio.

Figure 4:
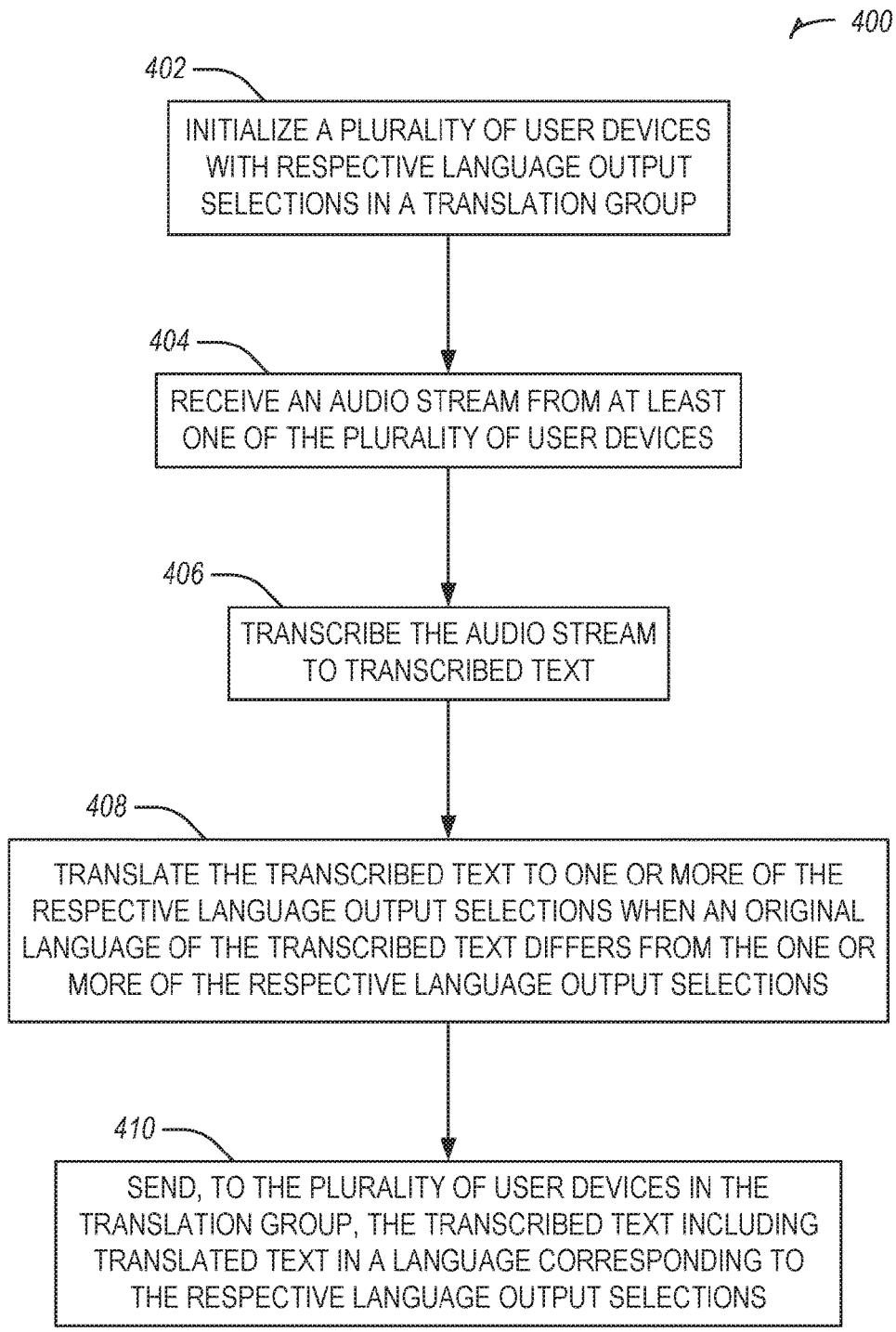
FIG. 4 illustrates a flowchart showing a technique for providing transcription and translation services in accordance with some embodiments.

FIG. 4 illustrates a flowchart showing a technique 400 for providing transcription and translation services in accordance with some embodiments. The technique 400 includes an operation 402 to initialize a plurality of user devices with respective language output selections in a translation group. In an example the initialization may include using an alphanumeric code, an RFID chip, an NFC chip, a QR code, a barcode, a Bluetooth low energy device (e.g., an iBeacon), or the like. The initialization may include receiving a first indication of initialization of a group session from a first device of the plurality of user devices. The initialization may include sending an alphanumeric code to the first device for sharing with other devices of the plurality of user devices. After a first device is initialized, operation 402 may include receiving an indication from one or more additional devices to create a group, and adding the first device and the one or more additional devices to the group to allow for communication among the first device and the one or more additional devices. In an example, the plurality of user devices is within a predetermined range of each other or of an initiation object.

The technique 400 includes an operation 404 to receive an audio stream from at least one of the plurality of user devices. Operation 404 may include receiving a second audio stream from a second user device of the plurality of user devices. In an example, the second audio stream may be recorded concurrently or in an overlapping time period with the audio stream. Transcribing the audio stream to the transcribed text may include transcribing the audio stream and the second audio stream to the transcribed text. In an example, text extracted from the audio stream and text extracted from the second audio stream are commingled in the transcribed text. In an example, a first transcribable word spoken during a portion of the audio stream and a second transcribable word spoken during a portion of the second audio stream are recorded by respective devices during a time period that at least partially overlaps.

The technique 400 includes an operation 406 to transcribe the audio stream to transcribed text. The text may be transcribed using a model customized to a user of the at least one of the plurality of user devices. In an example, the model customized to the user is created based on a user selected topic domain for the audio stream. For example, the model may include a personalized models (e.g., as selected using an opt-in feature), language-specific models (e.g., based on a technical subject, a regional dialect, an accent, foreign-language words, technical jargon specific to a particular domain, people's names, product or brand names, technical jargon used within an institution, or the like). In an example, the model may be based on historical data from the user, for example, based on previous audio streams submitted by the user.

The technique 400 includes an operation 408 to translate the transcribed text to one or more of the respective language output selections when an original language of the transcribed text differs from the one or more of the respective language output selections. In an example, translating the transcribed text may include using translation models customized to respective users, such as corresponding to the respective language output selections. The customized models may include personalized models or language-specific models as described above, or may be customized based on the selected language.

The technique 400 includes an operation 410 to send, to the plurality of user devices in the translation group, the transcribed text including translated text in a language corresponding to the respective language output selections. In an example, sending the transcribed text includes sending the transcribed text in a first language to a first user device of the plurality of user devices, sending the transcribed text in a second language to a second user device of the plurality of user devices, and wherein the first language and the second language differ from the original language of the transcribed text. In another example, sending the transcribed text includes sending audio data for playback at the plurality of user devices, the audio data being in a language corresponding to the respective language output selections or sending the text to be converted to audio at the respective user devices. In another example, text-to-speech (TTS) processing may be used at the user devices to convert the text to audio. For example, at least one of the plurality of user devices may play the audio data without using a graphical user interface to display the transcribed text. Sending the transcribed text may include sending the transcribed text to a first user device using a first network and sending the transcribed text to a second user device using a second network. In this example, the first and second user devices do not need to communicate directly, but may instead communicate via a cloud service.

Figure 5:
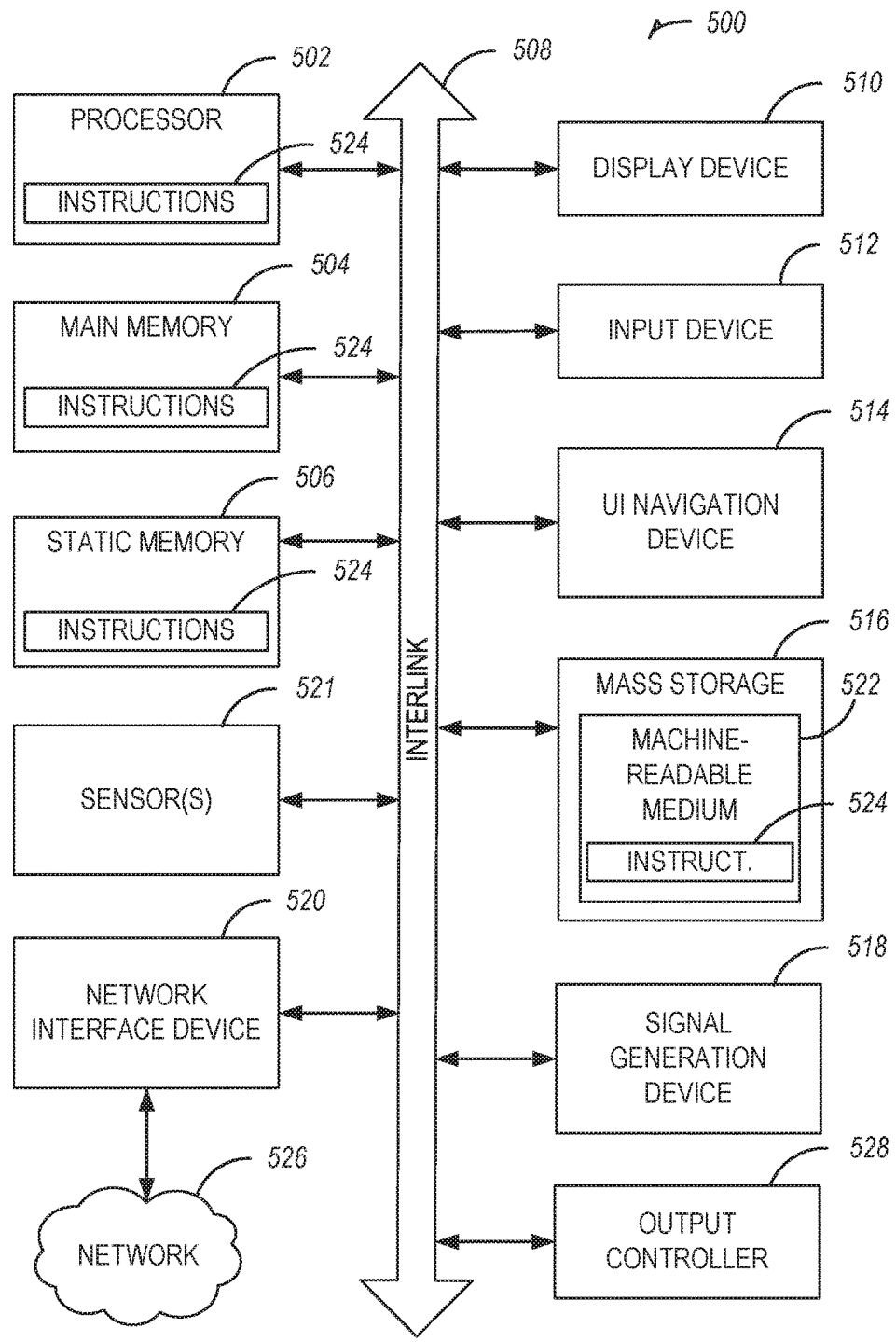
FIG. 5 illustrates generally an example of a block diagram of a machine upon which any one or more of the techniques (e.g., methodologies) discussed herein may perform in accordance with some embodiments.

FIG. 5 illustrates generally an example of a block diagram of a machine 500 upon which any one or more of the techniques (e.g., methodologies) discussed herein may perform in accordance with some embodiments. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, alphanumeric input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 that is non-transitory on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, data sources, or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®. IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

VARIOUS NOTES & EXAMPLES

Each of these non-limiting examples may stand on its own, or may be combined in various permutations or combinations with one or more of the other examples.

Example 1 is a computing system, comprising: a processor; and a memory device including instructions embodied thereon, wherein the instructions, when executed by the processor, configure the processor to perform operations that provide translation services, including operations to: initialize a plurality of user devices with respective language output selections in a translation group by receiving a shared identifier from the plurality of user devices; receive an audio stream from at least one of the plurality of user devices; transcribe the audio stream to transcribed text using a model customized to a user of the at least one of the plurality of user devices; translate the transcribed text to one or more of the respective language output selections when an original language of the transcribed text differs from the one or more of the respective language output selections; and send, to the plurality of user devices in the translation group, the transcribed text including translated text in a language corresponding to the respective language output selections.

In Example 2, the subject matter of Example 1 optionally includes wherein the operations to send the transcribed text include operations to send the transcribed text in a first language to a first user device of the plurality of user devices, send the transcribed text in a second language to a second user device of the plurality of user devices, and wherein the first language and the second language differ from the original language of the transcribed text.

In Example 3, the subject matter of any one or more of Examples 1-2 optionally include wherein the operations to send the transcribed text include operations to send audio data for playback at the plurality of user devices, the audio data being in a language corresponding to the respective language output selections.

In Example 4, the subject matter of Example 3 optionally includes wherein at least one of the plurality of user devices plays the audio data without using a graphical user interface to display the transcribed text.

In Example 5, the subject matter of any one or more of Examples 1-4 optionally include wherein the operations to send the transcribed text include operations to send the transcribed text to a first user device using a first network and to send the transcribed text to a second user device using a second network.

In Example 6, the subject matter of any one or more of Examples 1-5 optionally include wherein the operations to receive the audio stream include operations to receive a second audio stream from a second user device of the plurality of user devices, the second audio stream recorded concurrently with the audio stream, and wherein to transcribe the audio stream to the transcribed text includes to transcribe the audio stream and the second audio stream to the transcribed text, and wherein text extracted from the audio stream and text extracted from the second audio stream are commingled in the transcribed text.

In Example 7, the subject matter of Example 6 optionally includes wherein a first transcribable word spoken during a portion of the audio stream and a second transcribable word spoken during a portion of the second audio stream are recorded by respective devices during a time period that at least partially overlaps.

In Example 8, the subject matter of any one or more of Examples 1-7 optionally include wherein the operations to initialize the plurality of user devices include operations to receive an alphanumeric code from each of the plurality of user devices, the alphanumeric code corresponding to the translation group.

In Example 9, the subject matter of any one or more of Examples 1-8 optionally include wherein the operations to initialize the plurality of user devices include operations to receive an indication from each of the plurality of user devices, the indication corresponding to an RFID chip, an NFC chip, a QR code, or a Bluetooth low energy device.

In Example 10, the subject matter of any one or more of Examples 1-9 optionally include wherein the plurality of user devices are within a predetermined range of each other.

Example 11 is a method for providing translation services, the method comprising: at a cloud service: initializing a plurality of user devices with respective language output selections in a translation group by receiving a shared identifier from the plurality of user devices; receiving an audio stream from at least one of the plurality of user devices; transcribing the audio stream to transcribed text using a model customized to a user of the at least one of the plurality of user devices; translating the transcribed text to one or more of the respective language output selections when an original language of the transcribed text differs from the one or more of the respective language output selections; and sending, to the plurality of user devices in the translation group, the transcribed text including translated text in a language corresponding to the respective language output selections.

In Example 12, the subject matter of Example 11 optionally includes wherein sending the transcribed text includes sending the transcribed text in a first language to a first user device of the plurality of user devices, sending the transcribed text in a second language to a second user device of the plurality of user devices, and wherein the first language and the second language differ from the original language of the transcribed text.

In Example 13, the subject matter of any one or more of Examples 11-12 optionally include wherein the model customized to the user is created based on a user selected topic domain for the audio stream.

In Example 14, the subject matter of any one or more of Examples 11-13 optionally include wherein the model customized to the user is created based on previous audio streams submitted by the user.

In Example 15, the subject matter of any one or more of Examples 11-14 optionally include wherein sending the transcribed text includes sending audio data for playback at the plurality of user devices, the audio data being in a language corresponding to the respective language output selections.

Example 16 is at least one machine-readable medium including instructions for providing translation services, which when executed by a machine, cause the machine to: initialize a plurality of user devices with respective language output selections in a translation group by receiving a shared identifier from the plurality of user devices; receive an audio stream from at least one of the plurality of user devices; transcribe the audio stream to transcribed text using a model customized to a user of the at least one of the plurality of user devices; translate the transcribed text to one or more of the respective language output selections when an original language of the transcribed text differs from the one or more of the respective language output selections; and send, to the plurality of user devices in the translation group, the transcribed text including translated text in a language corresponding to the respective language output selections.

In Example 17, the subject matter of Example 16 optionally includes instructions to receive a second audio stream from a second user device of the plurality of user devices, the second audio stream recorded concurrently with the audio stream, wherein the instructions to transcribe the audio stream to the transcribed text include instructions to transcribe the audio stream and the second audio stream to the transcribed text, and wherein text extracted from the audio stream and text extracted from the second audio stream are commingled in the transcribed text.

In Example 18, the subject matter of Example 17 optionally includes wherein a first transcribable word spoken during a portion of the audio stream and a second transcribable word spoken during a portion of the second audio stream are recorded by respective devices during a time period that at least partially overlaps.

In Example 19, the subject matter of any one or more of Examples 16-18 optionally include wherein the instructions to initialize the plurality of user devices include instructions to receive an indication from each of the plurality of user devices, the indication corresponding to an RFID chip, an NFC chip, a QR code, or a Bluetooth low energy device.

In Example 20, the subject matter of any one or more of Examples 16-19 optionally include wherein the model customized to the user is created based on a user selected topic domain for the audio stream.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A computing system, comprising:
   a processor; and
   a memory device including instructions embodied thereon, wherein the instructions, when executed by the processor, configure the processor to perform operations that provide translation services, including operations to:
   initialize, using an initiation device, a plurality of user devices in a translation group by receiving a shared identifier from each of the plurality of user devices, each of the plurality of user devices indicating respective language output selections, wherein the shared identifier is received from each of the plurality of user devices when each of the plurality of user devices are within range of a proximity service of the initiation device;
   receive an audio stream from at least one of the plurality of user devices;
   transcribe the audio stream to transcribed text using a model customized to a user of the at least one of the plurality of user devices;
   translate the transcribed text to one or more of the respective language output selections in response to determining that an original language of the transcribed text differs from the one or more of the respective language output selections; and
   send, to the plurality of user devices in the translation group, the transcribed text including translated text in a language corresponding to the respective language output selections.

2. The computing system of claim 1, wherein the operations to send the transcribed text include operations to send the transcribed text in a first language to a first user device of the plurality of user devices and send the transcribed text in a second language to a second user device of the plurality of user devices, and wherein the first language and the second language differ from the original language of the transcribed text.

3. The computing system of claim 1, wherein the operations to send the transcribed text include operations to send audio data for playback at the plurality of user devices, the audio data being in a language corresponding to the respective language output selections.

4. The computing system of claim 3, wherein at least one of the plurality of user devices plays the audio data without using a graphical user interface to display the transcribed text.

5. The computing system of claim 1, wherein the operations to send the transcribed text include operations to send the transcribed text to a first user device using a first network and to send the transcribed text to a second user device using a second network.

6. The computing system of claim 1, wherein the operations to receive the audio stream include operations to receive a second audio stream from a second user device of the plurality of user devices, the second audio stream recorded concurrently with the audio stream, wherein the operations to transcribe the audio stream to the transcribed text includes operations to transcribe the audio stream and the second audio stream to the transcribed text, and wherein text extracted from the audio stream and text extracted from the second audio stream are commingled in the transcribed text.

7. The computing system of claim 6, wherein a first transcribable word spoken during a portion of the audio stream and a second transcribable word spoken during a portion of the second audio stream are recorded by respective devices during a time period that at least partially overlaps.

8. The computing system of claim 1, wherein the operations to initialize the plurality of user devices include operations to receive an alphanumeric code from each of the plurality of user devices, the alphanumeric code corresponding to the translation group.

9. The computing system of claim 1, wherein the operations to initialize the plurality of user devices include operations to receive an indication from each of the plurality of user devices, the indication corresponding to an RFID chip, an NFC chip, a QR code, or a Bluetooth low energy device.

10. The computing system of claim 1, wherein the plurality of user devices are within a predetermined range of each other.

11. A method for providing translation services via a service, the method comprising electronic operations performed by a computing system operating the service, with the electronic operations including:

initializing, using an initiation device, a plurality of user devices in a translation group by receiving a shared identifier from each of the plurality of user devices, each of the plurality of user devices indicating respective language output selections, wherein the shared identifier is received from each of the plurality of user devices when each of the plurality of user devices are within range of a proximity service of the initiation device;

receiving an audio stream from at least one of the plurality of user devices, the plurality of user devices indicating respective language output selections;

transcribing the audio stream to transcribed text using a model customized to a user of the at least one of the plurality of user devices;

translating the transcribed text to one or more of the respective language output selections in response to determining that an original language of the transcribed text differs from the one or more of the respective language output selections; and sending, to the plurality of user devices in the translation group, the transcribed text including translated text in a language corresponding to the respective language output selections.

12. The method of claim 11, wherein sending the transcribed text includes sending the transcribed text in a first language to a first user device of the plurality of user devices and sending the transcribed text in a second language to a second user device of the plurality of user devices, and wherein the first language and the second language differ from the original language of the transcribed text.

13. The method of claim 11, wherein the model customized to the user is created based on a user-selected topic domain for the audio stream or previous audio streams submitted by the user.

14. The method of claim 11, wherein initializing the plurality of user devices includes receiving an indication from each of the plurality of user devices, the indication corresponding to an RFID chip, an NFC chip, a QR code, or a Bluetooth low energy device.

15. The method of claim 11, wherein sending the transcribed text includes sending audio data for playback at the plurality of user devices, the audio data being in a language corresponding to the respective language output selections.

16. At least one non-transitory machine-readable medium including instructions for providing translation services, which when executed by a machine, cause the machine to:

initialize, using an initiation device, a plurality of user devices in a translation group by receiving a shared identifier from each of the plurality of user devices, each of the plurality of user devices indicating respective language output selections, wherein the shared identifier is received from each of the plurality of user devices when each of the plurality of user devices are within range of a proximity service of the initiation device;

receive an audio stream from at least one of the plurality of user devices;

transcribe the audio stream to transcribed text using a model customized to a user of the at least one of the plurality of user devices;

translate the transcribed text to one or more of the respective language output selections in response to determining that an original language of the transcribed text differs from the one or more of the respective language output selections; and send, to the plurality of user devices in the translation group, the transcribed text including translated text in a language corresponding to the respective language output selections.

17. The machine-readable medium of claim 16, further comprising instructions to receive a second audio stream from a second user device of the plurality of user devices, the second audio stream recorded concurrently with the audio stream, wherein the instructions to transcribe the audio stream to the transcribed text include instructions to transcribe the audio stream and the second audio stream to the transcribed text, and wherein text extracted from the audio stream and text extracted from the second audio stream are commingled in the transcribed text.

18. The machine-readable medium of claim 17, wherein a first transcribable word spoken during a portion of the audio stream and a second transcribable word spoken during a portion of the second audio stream are recorded by respective devices during a time period that at least partially overlaps.

19. The machine-readable medium of claim 16, wherein the instructions to initialize the plurality of user devices include instructions to receive an indication from each of the plurality of user devices, the indication corresponding to an RFID chip, an NFC chip, a QR code, or a Bluetooth low energy device.

20. The machine-readable medium of claim 16, wherein the model customized to the user is created based on a user-selected topic domain for the audio stream.

* * * * *